(12) United States Patent
Mohapatra et al.

(10) Patent No.: US 7,919,184 B2
(45) Date of Patent: Apr. 5, 2011

(54) HYBRID NANOPARTICLES

(76) Inventors: Satish C. Mohapatra, Easton, PA (US); Edward David Sudol, Bethlehem, PA (US); Kejian Bian, Bethlehem, PA (US); Li Zhang, Bethlehem, PA (US); Eric Scott Daniels, Bethlehem, PA (US); Victoria Laurentia Dimonie, Bethlehem, PA (US); Andrew Klein, Somerville, NJ (US)

( * ) Notice: Subject to any disclaimer, the term of this patent is extended or adjusted under 35 U.S.C. 154(b) by 367 days.

(21) Appl. No.: 11/894,883

(22) Filed: Aug. 21, 2007

(65) Prior Publication Data

US 2008/0272331 A1    Nov. 6, 2008

(51) Int. Cl.
*B32B 5/16* (2006.01)
*B32B 15/04* (2006.01)

(52) U.S. Cl. .................. 428/402.24; 428/403; 428/407; 428/484.1; 428/457; 428/515; 428/461

(58) Field of Classification Search .................. None
See application file for complete search history.

(56) References Cited

U.S. PATENT DOCUMENTS

2006/0083694 A1*  4/2006  Kodas et al. .................... 424/46
2009/0156757 A1*  6/2009  Wang et al. .................. 525/92 R

* cited by examiner

*Primary Examiner* — Ling Xu
(74) *Attorney, Agent, or Firm* — Ash Tankha; IP Legal Services

(57) ABSTRACT

A method and composition for making hybrid nanoparticles and use of such nanoparticles are disclosed herein. In one embodiment of the invention, the hybrid nanoparticles comprise a phase change material (PCM) and a metal layer encapsulating the phase change material. In another embodiment of the invention, the hybrid nanoparticles comprise a phase change material, a polymer layer encapsulating the phase change material, and an outer metal layer encapsulating the polymer layer. In another embodiment of the invention, the hybrid nanoparticles comprise an inner core of a PCM encapsulated by a polymer shell containing embedded nanoparticles that have a high thermal conductivity.

18 Claims, 3 Drawing Sheets

Structure of a PCM and metal shell hybrid nanoparticle

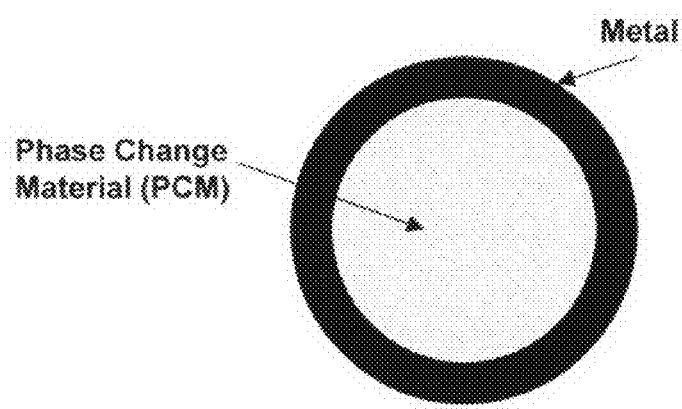
Figure 1. Structure of a PCM and metal shell hybrid nanoparticle

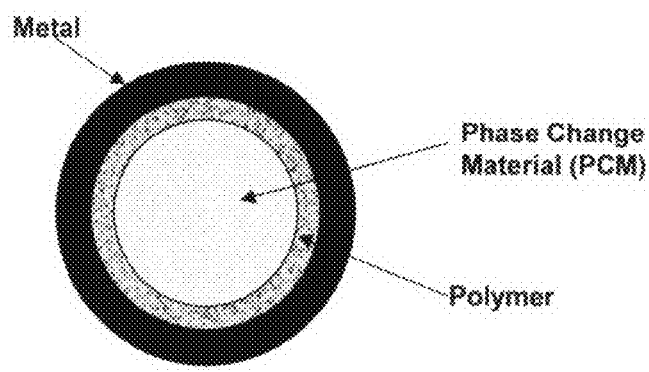
Figure 2. Structure of a PCM, polymer layer, and metal shell hybrid nanoparticle

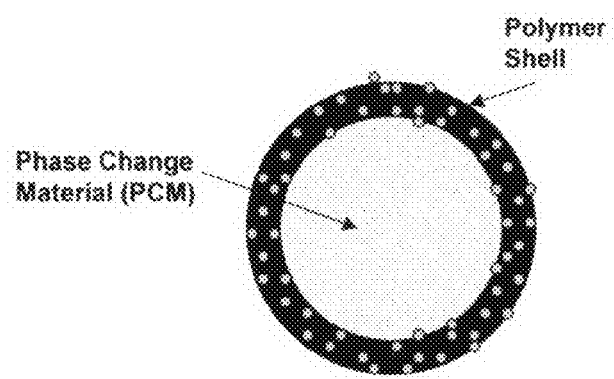
Figure 3. Structure of a PCM and polymer shell (embedded with nanoparticles) hybrid nanoparticle. The gray circles in the polymer shell layer are nanoparticles.

HYBRID NANOPARTICLES

STATEMENT REGARDING FEDERALLY SPONSORED RESEARCH

This invention is supported, in part, by the US Department of Defense, Small Business Innovation Research Grant, grant # FA8650-05-M-2506.

This application claims the benefit of provisional application No. 60/839,092 titled Hybrid Nanoparticles, filed Aug. 21, 2006.

BACKGROUND OF THE INVENTION

Nanoparticles are particles with a diameter ranging from about 1 nm to 1000 nm. There are different types of nanoparticles available in the market place. Metals (such as copper, gold, and silver), metal oxides (such as zinc oxide, copper oxide), diamond and other forms of carbon have been used to make their respective nanoparticles. These particles have demonstrated applications in several fields such as drug-delivery, cosmetics formulations and heat transfer fluids.

The important properties for a heat transfer fluid in relation to heat transfer capabilities are the following: specific heat capacity ($C_p$), thermal conductivity (k), viscosity ($\mu$), and density ($\rho$). Specific heat capacity ($C_p$) is a function of the energy (thermal) storage capacity of a fluid and it also affects the fluid side heat transfer coefficient in heat exchangers. Thermal conductivity (k) affects the heat transfer coefficient more significantly than the other parameters. Viscosity and density are also very important for heat transfer as well as pumping power requirement for the heat transfer fluid.

The most commonly used fluids for cooling applications are water and fluorocarbons. An example of a fluorocarbon based heat transfer fluid is FC-77, a 3M Corporation product. Water has excellent thermal properties such as a high latent heat of evaporation, specific heat and thermal conductivity, but is not adequate for single-phase liquid cooling of high heat flux applications. In addition, water cannot be used in applications where ambient temperature may reach below 0° C. Water/glycol mixtures provide a low freezing point, but their thermo-physical properties are inferior compared to pure water. Fluorocarbons are inert and dielectric, and are therefore used in immersion as well as spray cooling applications in direct contact with electronics circuits. However, their specific heat and thermal conductivity are far worse than water and glycol/water mixtures and they are extremely expensive (>$200/gallon). All these fluids do not have an in-built energy storage mechanism other than the sensible heat, i.e., specific heat capacity.

The method and composition disclosed herein is for a hybrid nanoparticle that can be used as a component in a fluid or other media to provide enhanced thermal storage capability, thereby increasing the specific heat capacity as well as the thermal conductivity of the base fluid. The concept is to utilize the heat of fusion of a phase change material, for example paraffin, to absorb thermal energy from the heat source and then release it in a heat sink/radiator during the solidification of the phase change material.

Also disclosed herein is a fluid that utilizes hybrid nanoparticles to increase the specific heat capacity as well as thermal conductivity of the heat transfer fluid. Phase change materials (PCM) in an encapsulated form (about 100 microns) have been tried as a means to increase the specific heat ($C_p$) of a fluid by utilizing their latent heat of fusion, whereas copper and other nanoparticles have been incorporated into heat transfer fluids to increase the thermal conductivity (k) of the heat transfer fluids. PCMs have been very successful in static/passive thermal management systems for example, thermal interface materials, body suits/vests, cold/thermal storage, but in heat transfer fluid applications there have been problems of mechanical damage, supercooling of the PCMs inside microcapsules, agglomeration, and blockage of the heat exchanger channels.

Nanofluids, i.e., suspensions of metal or metal oxide nanoparticles in a base fluid have been developed to increase the thermal conductivity of the base fluid. However, addition of nanoparticles to a fluid does not increase the specific heat capacity, i.e., the energy storage capacity of the base fluid. Therefore, a nano-fluid may be able to dissipate higher heat fluxes, but it does not have good thermal storage or transport capability.

Heat transfer fluids currently available do not provide a high heat flux and have limited applications where high heat flux is required. The technical challenge is to develop a water-based fluid with low freezing point and very high heat capacity and thermal conductivity.

Disclosed herein is a method and composition for hybrid nanoparticles, and a composition of a heat transfer fluid medium utilizing the hybrid nanoparticles. The hybrid nanoparticle has an outer layer that has very high thermal conductivity and an inner core that comprises a phase change material (PCM) that has thermal storage capability due to the latent heat absorbed or released during phase change. These hybrid nanoparticles can also be used in other process applications, for example, in a heat transfer gel, thermal interface materials, sensors and biomedical applications.

BRIEF DESCRIPTION OF THE DRAWINGS

FIG. 1 illustrates a structure of a phase change material (PCM) and metal shell hybrid nanoparticle.

FIG. 2 illustrates a structure of a phase change material (PCM), polymer layer, and metal shell hybrid nanoparticle.

FIG. 3 illustrates a structure of a phase change material (PCM) and polymer shell embedded with nanoparticles.

DETAILED DESCRIPTION OF THE INVENTION

Disclosed herein is a method and composition for hybrid nanoparticles, and also a composition of a heat transfer fluid medium utilizing the hybrid nanoparticles that addresses the shortcomings of existing heat transfer fluids by combining a base composition, which for example, may be a mixture of water and an antifreeze compound with specially designed hybrid nanoparticles. The base composition addresses the freezing point, flash point, and material compatibility requirements of the fluid, whereas the nanoparticles are designed to increase the specific heat capacity as well as the thermal conductivity of the fluid. Furthermore, the extremely small size of these hybrid nanoparticles which range in size from about 10 to about 1000 nanometers eliminates the problem of abrasion as well as blockage of heat exchange passages.

Described below are three embodiments of the structure and method of manufacture of hybrid nanoparticles.

I. PCM and Metal Shell Nanoparticle

In this type of hybrid nanoparticle structure, the inner core is a phase change material (PCM) and the outer shell is a metal as shown in FIG. 1. The outside diameter of the nanoparticle can be from about 10 nm up to about 1000 nm. The PCM can be any material that undergoes a phase change, for example, wax, paraffin, terpene, salt hydrate, silicone, a polymer, etc. The metal layer comprise metals or alloys of metals having a high conductance, for example, copper, gold, silver, aluminum, iron, nickel, etc.

The purpose of using a metal or an alloy as the shell within which to encapsulate the PCM is two-fold. First, since metals are excellent conductors of heat, the hybrid nano-particle will increase the thermal conductivity of the heat transfer fluid. The metal shell also will transfer heat into or out of the inner PCM core very quickly. Second, a complete metal layer surrounding the core should provide a rigid and impermeable barrier between the chemicals located inside and outside of the nanoparticles.

The method of making PCM-metal shell hybrid nanoparticles illustrated in FIG. 1 is as follows. The PCM is melted by heating it in a container above its melting point. Then the melted PCM is added to water containing an emulsifier at a temperature higher than the melting point of the PCM under high shear mixing. The resultant emulsion of the PCM is cooled below the melting point of the PCM to obtain a dispersion of the core PCM particles in water.

In another embodiment of the invention, the dispersion of the core PCM particles in water is made as follows. The PCM is added to water with the emulsifier. Then the resulting mixture is heated above the melting point of the PCM while applying high shear mixing. The resultant emulsion of the PCM is then cooled below the melting point of the PCM to obtain a dispersion of the core PCM particles in water.

The method of creating a metal shell around the PCM core particles can be performed by two approaches. In the electroless metal deposition process, the PCM surface is sensitized by a metal salt, for example metal chloride, metal fluoride, metal sulfate, metal nitrate, etc. The PCM surface is thereafter activated with a metal catalyst, for example, salts of palladium, nickel, platinum, rhodium, etc., and then metal ions are reduced by a reducing agent, for example, formaldehyde, on the catalyst sites to grow metal islands that merge to form a continuous shell.

In another embodiment of the invention, metal nanoparticles are heteroflocculated to the PCM by electrostatic attraction with a stabilizer such as sodium stearic acid, sodium oleic acid and other such surfactants to form a hybrid nanoparticle with a PCM core and a continuous metal shell around the PCM core.

Example 1, below, illustrates the manufacture of PCM and metal shell hybrid nanoparticles, described with reference to FIG. 1.

EXAMPLE 1

Step 1: Paraffin (PCM) is melted at 65° C. The melting point of the paraffin is 50° C. in this example.
Step 2: Melted paraffin is added to water containing sodium stearic acid (an emulsifier) at 65° C. using high shear mixing to create an emulsion of the paraffin in water. Alternatively, paraffin can be added to water containing sodium stearic acid. Then the mixture can be heated to 65° C. and mixed by applying high shear to create an emulsion of the paraffin in water.
Step 3: The resulting emulsion is cooled below the melting point of paraffin (for example to about 50° C.) to solidify the paraffin. The result is a dispersion of the paraffin core particles in the water medium.
Step 4: The surfaces of the paraffin particles are sensitized by stannous chloride.
Prepare the following mixture:
40 ml/l HCl
7.5 g/l stannous chloride Expose paraffin particles from Step 3 to the HCl/stannous chloride mixture, above, for 5 min.
Step 5: The surface of the paraffin is activated with a metal catalyst, for example, palladium chloride.
Prepare 0.25 g/l palladium chloride solution
Expose sensitized paraffin particles from Step 4 to the palladium chloride solution for 10 min. To regulate metal shell thickness around the paraffin core, the exposure time of the sensitized paraffin particles from Step 4 in the palladium chloride catalyst solution in step 5 may be varied.
Step 6: Copper ions from the solution are reduced on to the catalyst sites to grow metal islands that ultimately merge to form a continuous metal shell around the paraffin as shown in FIG. 1.
Prepare the following mixture:
26 g/l $CuSO_4*5H_2O$
17.5 ml/l HCHO (37% solution)
43 g/l $KNaC_4H_4O_6*4H_2O$
21 g/l NaOH
Expose particles from step 5 in the mixture of step 6, above to form a hybrid nanoparticle with a continuous copper shell around the paraffin core.

The formaldehyde mediated reduction at the palladium site in Step 6 is thought to proceed as follows:

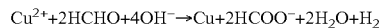
$$Cu^{2+}+2HCHO+4OH^-\rightarrow Cu+2HCOO^-+2H_2O+H_2$$

Cu is deposited on the paraffin surfaces as islands which grow to form a continuous shell, and forms a PCM-metal shell hybrid nanoparticle.

The resultant PCM and metal shell hybrid nanoparticles can be dispersed in a heat transfer medium, for example, water, ethylene glycol (EG), propylene glycol (PG), glycol/water mixtures, hydrocarbon oils, vegetable oils, silicone oils, alcohols, salt solutions, brines, fluorocarbons and the resultant fluid containing the nanoparticles can be circulated in a system to remove heat from a heat source and carry it to a heat sink. The concentration of nanoparticles in the resultant heat transfer fluid can be from 0.01% by weight to about 50% by weight of the total liquid phase. In addition to the nanoparticles, additives can be added to the heat transfer fluids. These additives include but not limited to antioxidants, corrosion inhibitors, anti-foam agents, lubricating agents, chelating agents, surfactants, dyes, viscosity modifiers and buffers.

These hybrid nanoparticles can also be used in other process applications for example, in a heat transfer gel, thermal interface materials, sensors and biomedical applications.

Example 2, below, illustrates the manufacture of PCM and metal shell hybrid nanoparticles described with reference to FIG. 1.

EXAMPLE 2

Step 1: Paraffin (PCM) is melted at 65° C. The melting point of the paraffin is 50° C. in this example.
Step 2: Melted paraffin is added to water containing sodium stearic acid (an emulsifier) at 65° C. using high shear mixing to create an emulsion of the paraffin in water. Alternatively, paraffin can be added to water containing sodium stearic acid. Then the mixture is heated to 65° C. and mixed by applying high shear to create an emulsion of the paraffin in water.
Step 3: The resulting emulsion is cooled below the melting point of paraffin (for example to about 50° C.) to solidify the paraffin. The result is a dispersion of the PCM core particles in water medium.

Step 4: Gold nanoparticles (about 1-10 nm) of an opposite charge to that of the paraffin are added to the dispersion.

Step 5: Sodium stearic acid is added as a stabilizer and the gold particles are heteroflocculated on the paraffin particles by electrostatic attraction (due to opposite charges). The result is a hybrid nanoparticles containing a paraffin core and a gold shell.

The resultant PCM and metal shell hybrid hybrid nanoparticles can be dispersed in a heat transfer medium, for example, water, ethylene glycol (EG), propylene glycol (PG), glycol/water mixtures, hydrocarbon oils, vegetable oils, silicone oils, alcohols, salt solutions, brines, fluorocarbons and the resultant fluid containing the nanoparticles can be circulated in a system to remove heat from a heat source and carry it to a heat sink. The concentration of nanoparticles in the resultant heat transfer fluid can be from 0.01% by weight to about 50% by weight of the total liquid phase. In addition to the nanoparticles, additives can be added to the heat transfer fluids. These additives comprise antioxidants, corrosion inhibitors, anti-foam agents, lubricating agents, chelating agents, surfactants, dyes, viscosity modifiers and buffers.

These hybrid nanoparticles can also be used in other process applications such as in a heat transfer gel, thermal interface materials, sensors and biomedical applications, etc.

II. PCM, Polymer Layer and Metal Shell Nanoparticle

In this type of nanoparticle structure, the inner core is a PCM and is encapsulated by a polymer layer with a metal shell encapsulating the polymer layer as illustrated in FIG. 2. The purpose of the polymer layer is to keep the PCM contained within the hybrid nanoparticle, i.e., prevent leakage of the PCM when it is in a liquid phase, act as a substrate to anchor the outer metal shell to the hybrid nanoparticle, and prevent rupture of the metal shell by the expansion and contraction associated with the PCM during phase change. The outside diameter of this hybrid nanoparticle can be from about 10 nm to about 1000 mn.

The PCM nanoparticles can be encapsulated within a polymeric shell layer by three primary methods: (1) seeded emulsion polymerization, (2) mini-emulsion polymerization, and (3) mini-emulsification.

In the seeded emulsion polymerization approach, PCM nanoparticles are used as the seed particles, i.e., act as the locus of polymerization in an emulsion polymerization process. Monomer(s) is/are fed into a reactor slowly over time in the presence of the seed PCM nanoparticles dispersed in an aqueous continuous medium containing a surfactant and initiator. The monomer polymerizes around the seed PCM nanoparticles to form a thin polymeric shell. The seed PCM nanoparticle/monomer ratio, type of monomer(s), the interfacial tensions at the nanoparticle/aqueous medium or at the nanoparticle/monomer interface are controlled to form a uniform polymer shell encapsulating the PCM nanoparticles. A metal shell layer can then be generated around the thin polymer layer using the following method.

Step 1: Prepare miniemulsion by homogenizing 5 g styrene, 0.5 g vinyl imidazole, 0.05 g divinylbenzene, 6.75 g eicosane PCM, and 0.1 g 2,2'azobis(2-amidinopropane) initator (oil phase) in 40 mL water, 0.146 g cetyltrimethylammonium bromide, 0.2 g hexadecane (aqueous phase) for 8 minutes.

Step 2: Polymerize in 100 mL bottle tumbled with a rate of 30 rpm at 70° C.

Step 3: Carry out seeded polymerization of comonomer mixture (0.196 g styrene, 0.192 vinyl imidazole) on latex particles formed by above procedure in a bottle polymerizer unit for 18 hours at 70° C. to increase the amount of vinyl imidazole incorporated in thin polymer shell layer encapsulating the PCM core.

Step 4: Prepare gold-associated encapsulated PCM by slowly adding 30 mL $HAuCl_4$ (230 g gold per liter) dropwise into latex formed in Step 3 diluted in 25 mL water with magnetic stirring at room temperature for 18 hours.

Step 5: Clean this latex by centrifugation/redispersion or by the serum replacement method.

Step 6: Prepare gold-seeded or gold nucleated encapsulated PCM particles by reducing the gold ions of the previously prepared (Step 4) encapsulated PCM particles by adding 4 mL of dimethylamine borane reducing agent dropwise to 0.363 g of the latex prepared in Step 4 in 42 mL of water with magnetic stirring for 3.5 hours at room temperature.

In this method a thin gold metal shell layer can be incorporated around polymer-shell layer encapsulated PCM particles.

In the miniemulsion polymerization method, the PCM nanoparticles are dispersed in a monomer mixture with the aid of a stabilizer. Also included in the monomer mixture (an oil phase) is a co-stabilizer, for example, hexadecane for the miniemulsion droplets. This monomer phase is then dispersed via mechanical mixing in an aqueous phase containing a surfactant and perhaps a buffer as well. The oil and aqueous phases are homogenized together with a device such as a sonifier to form stable miniemulsion droplets (50-400 nm in size) with PCM nanoparticles dispersed within. These miniemulsion droplets are then polymerized using a free radical initiator. The resultant particles are comprised of PCM core encapsulated within a polymeric shell (e.g., Steps 1 and 2 above). An example recipe (EC-9) to prepare encapsulated PCM via the miniemulsion polymerization of styrene follows. A metal shell layer can then be incorporated around the PCM core/polymer shell layer as described in Steps 4-6 above.

Step 1: 5 g Styrene (distilled), 0.52 g vinyl imidazole (co-monomer), 0.05 g divinylbenzene (crosslinker), together with 0.2 g hexadecane co-stabilizer were weighed and were added to a melted PCM (eicosane; 2.3 g) solution.

Step 2: Cetyltrimethylammonium bromide surfactant (0.146 g) was dissolved in deionized water (40 mL) to form an aqueous phase and added to the oil phase dropwise with magnetic stirring at room temperature for at least 15 minutes.

Step 3: The oil and aqueous phases were homogenized by sonication with a sonifier (Branson, Model 450; Ultrasonics, Danbury, Conn.) in the pulsed mode with output power of 7 and duty cycle of 60% to form a miniemulsion. The miniemulsion was cooled with ice/water to prevent a temperature rise during the homogenization step.

Step 4: Nitrogen gas was bubbled into the miniemulsion for 8 minutes and the miniemulsion was immersed in a water bath preheated at 70° C.

Step 5: Initiator solution (0.1 g; V-50; 2,2'azobis(2-amidinopropane), which was also degassed separately, was then injected into the miniemulsion by syringe to start the polymerization. The polymerization was stopped at 4 hours, and cooled in a warm water to gradually lower the temperature to avoid possible polymer shell broken as a result of volume shrinkage.

The miniemulsification method is similar to the miniemulsion polymerization method in that the PCM nanoparticles are dispersed in an oil phase along with a stabilizer and co-stabilizer, where a polymer dissolved in the oil phase (including solvent for the polymer) has replaced the monomer. Just as in the miniemulsion polymerization method, this oil phase is dispersed in water containing a surfactant. The two phases are then homogenized together to form stable miniemulsion droplets comprised of PCM nanoparticles dispersed within a polymer and solvent solution in an aqueous medium. Instead of then polymerizing these droplets, as in the case of miniemulsion polymerization, the solvent is stripped out of the mixture, leaving the PCM nanoparticles encapsulated within a polymeric shell. The metal shell is formed around the resultant particle (PCM core with polymer shell) using the method discussed with reference to FIG. 1.

Example 3, below illustrates the process of making this PCM, polymer layer and metal layer hybrid nanoparticles.

EXAMPLE 3

Step 1: Paraffin (PCM) is melted at 65° C. The melting point of the paraffin is 50° C. in this example)

Step 2: Melted paraffin is added to water containing sodium stearic acid (an emulsifier) at 65° C. using high shear mixing to create an emulsion of the paraffin in water. Alternatively, paraffin can be added to water containing sodium stearic acid. Then the mixture can be heated to 65° C. and mixed by applying high shear to create an emulsion of the paraffin in water.

Step 3: The resulting emulsion is cooled below the melting point of paraffin (50° C.) to solidify the paraffin. The result is a dispersion of the PCM core particles in water medium.

Step 4: Polyvinyl pyrrolidone (polymer) is added to the aqueous phase and dissolved by stirring.

Step 5: The resultant mixture is cooled to about 25° C. (below the Theta point of polyvinyl pyrrolidone). The polymer is adsorbed on the PCM surface to create a thin shell.

The next step is to create the metal shell around the polymer layer. It is performed as follows:

Step 6: The surface of the polymer layer are sensitized by stannous chloride
Prepare the following mixture:
40 ml/l HCl
7.5 g/l stannous chloride
Expose paraffin particles from Step 3 to the HCl/stannous chloride mixture, above, for 5 min.

Step 7: The surface of the polymer layer is activated with a metal catalyst, palladium chloride.
Prepare 0.25 g/l palladium chloride solution
Expose paraffin particles with sensitized polymer layer from Step 6 to the palladium chloride solution for 10 min. To regulate metal shell thickness around the paraffin core, the exposure time of the sensitized paraffin particles from Step 6 in the palladium chloride catalyst solution in step 7 may be varied.

Step 8: Copper ions from the solution are reduced on to the catalyst sites to grow metal islands that ultimately merge and form a continuous metal shell around the polymer layer as shown in FIG. 2.
Prepare the following mixture:
26 g/l $CuSO_4*5H_2O$
17.5 ml/l HCHO (37% solution)
43 g/l $KNaC_4H_4O_6*4H_2O$
21 g/l NaOH
Expose particles from step 7 in the mixture of step 8, above to form a hybrid nanoparticle with a continuous copper shell around the paraffin core.

The resultant hybrid nanoparticle after step 8 has three layers, namely, a PCM core, a thin polymer layer surrounding the PCM core, and a metal shell surrounding the polymer layer.

The resultant hybrid nanoparticles containing a PCM core, a polymer layer surrounding the PCM core and a metal layer surrounding the polymer layer can be dispersed in a heat transfer medium such as water, ethylene glycol (EG), propylene glycol (PG), glycol/water mixtures, hydrocarbon oils, vegetable oils, silicone oils, alcohols, brines, fluorocarbons and the resultant fluid containing the nanoparticles can be circulated in a system to remove heat from a heat source and carry it to a heat sink. The concentration of nanoparticles in the resultant heat transfer fluid can be from about 0.01% by weight to about 50% by weight of the total liquid phase. In addition to the nanoparticles, additives can be added to the heat transfer fluids. These additives include comprise antioxidants, corrosion inhibitors, anti-foam agents, lubricating agents, chelating agents, surfactants, dyes, viscosity modifiers and buffers.

These hybrid nanoparticles can also be used in other process applications such as in a heat transfer gel, thermal interface materials, sensors and biomedical applications.

Example 4, below, illustrates the process of making this PCM, polymer layer and metal layer hybrid nanoparticles.

EXAMPLE 4

Step 1: Paraffin, polymethyl methacrylate (PMMA) and a mixture of solvents (for example, alcohols, ketones, tetrahydrofuran, hexane) are mixed in a container to create a liquid. The paraffin dissolves in this liquid at room temperature.

Step 2: The resulting liquid from Step 1 is added to water with an emulsifier, sodium stearic acid. Very high shear is used to create an emulsion.

Step 3: The solvent is slowly removed by vacuum and/or heating.

Step 4: The result is a dispersion of paraffin (hydrophobic PCM) particles with a PMMA (hydrophilic polymer) layer in an aqueous phase.

The next step is to create the metal shell around the PMMA layer. The process for encapsulating the PMMA layer with a metal shell is as follows:

Step 4: The surface of the PMMA layer is sensitized by stannous chloride
Prepare the following mixture:
40 ml/l HCl
7.5 g/l stannous chloride
Expose paraffin particles with PMMA layer from Step 3 to the HCl/stannous chloride mixture, above, for 5 min.

Step 5: The surface of the PMMA layer on the paraffin is activated with a metal catalyst, palladium chloride.
Prepare 0.25 g/l palladium chloride solution
Expose sensitized PMMA layer on the paraffin particles from Step 4 to the palladium chloride solution for 10 min. To regulate metal shell thickness around the PMMA layer, the exposure time of the sensitized particles from Step 4 in the palladium chloride catalyst solution in step 5 may be varied.

Step 6: Copper ions from the solution are reduced on to the catalyst sites to grow metal islands that ultimately merge and form a continuous metal shell around the polymer as shown in FIG. 2.
Prepare the following mixture:
26 g/l $CuSO_4*5H_2O$
17.5 ml/l HCHO (37% solution)
43 g/l $KNaC_4H_4O_6*4H_2O$
21 g/l NaOH Expose particles from step 5 in the mixture of step 6, above to form a hybrid nanoparticle with a continuous copper shell around the PMMA layer that is present around the paraffin core.

The resultant hybrid nanoparticle after step 6 has three layers, i.e., a paraffin PCM core, a thin polymer (PMMA) layer surrounding the PCM core, and a metal shell (copper) surrounding the polymer layer.

The resultant hybrid nanoparticles containing a PCM core, a polymer layer surrounding the PCM core and a metal layer surrounding the polymer layer can be dispersed in a heat transfer medium, for example, water, ethylene glycol (EG), propylene glycol (PG), glycol/water mixtures, hydrocarbon oils, vegetable oils, silicone oils, alcohols, brines, fluorocarbons and the resultant fluid containing the nanoparticles can be circulated in a system to remove heat from a heat source and carry it to a heat sink. The concentration of nanoparticles in the resultant heat transfer fluid can be from about 0.01% by weight to about 50% by weight of the total liquid phase. In addition to the nanoparticles, additives can be added to the heat transfer fluids. These additives comprise antioxidants, corrosion inhibitors, anti-foam agents, lubricating agents, chelating agents, surfactants, dyes, viscosity modifiers and buffers.

These hybrid nanoparticles can also be used in other process applications, for example, in a heat transfer gel, thermal interface materials, sensors and biomedical applications.

Example 5, below illustrates the process of making this PCM, polymer layer and metal layer hybrid nanoparticles. The only difference is that the sensitizing agent, stannous chloride, discussed in Example 1 is replaced with polyvinyl imidazole, which is also the polymer shell around the PCM core in Example 5.

EXAMPLE 5

Step 1: Paraffin, polyvinyl imidazole (polymer) and a mixture of solvents, for example, hexane and decane are mixed in a container to create a liquid.
Step 2: The resulting liquid from Step 1 is added to water with an emulsifier, for example, sodium stearic acid. Very high shear is used to create an emulsion.
Step 3: The solvent is slowly removed by vacuum and/or heating.
Step 4: The result is a dispersion of paraffin (hydrophobic PCM) particles with a polyvinyl imidazole (polymer) hydrophilic layer in an aqueous phase.
The next step is to create the metal shell around the polyvinyl imidazole layer. The process of encapsulating the polyvinyl imidazole layer by a metal shell is as follows:
Step 5: The surface of the polymer is activated with a metal catalyst, palladium chloride.
Prepare 0.25 g/l palladium chloride solution
Expose polymer shell around the paraffin particles from Step 4 to the palladium chloride solution for 10 min. To regulate metal shell thickness around the polymer layer, the exposure time of the polymer layer from Step 4 in the palladium chloride catalyst solution in step 5 may be varied.
Step 6: Copper ions from the solution are reduced on to the catalyst sites to grow metal islands that ultimately merge and form a continuous metal shell around the polymer as shown in FIG. 2.
Prepare the following mixture:
26 g/l $CuSO_4*5H_2O$
17.5 ml/l HCHO (37% solution)
43 g/l $KNaC_4H_4O_6*4H_2O$
21 g/l NaOH Expose particles from step 5 in the mixture of step 6, above to form a hybrid nanoparticle with a continuous copper shell around the paraffin core.

The surface sensitization step using stannous chloride is not required if polyvinyl imidazole is used as the polymer layer.

The resultant hybrid nanoparticle after Step 6 has three layers, i.e., a PCM (paraffin) core, a thin polymer (polyvinyl imidazole) layer surrounding the PCM core, and a metal shell (copper) surrounding the polymer layer.

The resultant hybrid nanoparticles containing a PCM core, a polymer layer surrounding the PCM core and a metal layer surrounding the polymer layer can be dispersed in a heat transfer medium, for example, water, ethylene glycol (EG), propylene glycol (PG), glycol/water mixtures, hydrocarbon oils, vegetable oils, silicone oils, alcohols, brines, fluorocarbons and the resultant fluid containing the nanoparticles can be circulated in a system to remove heat from a heat source and carry it to a heat sink. The concentration of nanoparticles in the resultant heat transfer fluid can be from about 0.01% by weight to about 50% by weight of the total liquid phase. In addition to the nanoparticles, additives can be added to the heat transfer fluids. These additives comprise antioxidants, corrosion inhibitors, anti-foam agents, lubricating agents, chelating agents, surfactants, dyes, viscosity modifiers and buffers.

These hybrid nanoparticles can also be used in other process applications such as in a heat transfer gel, thermal interface materials, sensors and biomedical applications.

III. Nanoparticle Comprising PCM-Polymer Layer Embedded With Nanoparticles

In this type of nanoparticle structure, the inner core is a PCM and is covered by a polymer shell with high conductivity nanoparticles, such as nano-diamonds embedded in the polymer shell as illustrated in FIG. 3. The purpose of the polymer shell is to keep the PCM contained, i.e., prevent leakage of the PCM when it is in a liquid phase, and keep the embedded nanoparticles in their positions. The polymer shell is embedded with nanoparticles that have a high conductance, for example, copper, diamond, carbon nanotube, silver, gold, aluminum, nickel, silicon and iron. The outside diameter of this hybrid nanoparticle can be from about 10 nm to about 1000 nm. The diameter of the embedded nanoparticles can be from about 1 nm. to about 20 nm.

A hybrid nanoparticle containing a PCM core and a polymer shell embedded with nanoparticles can be prepared by mixing the PCM with the polymer along with the nanoparticles containing surface charges in a mixture of solvents. This resulting mixture is then added to water along with an emulsifier and mixed at a very high shear rate. The solvent is then slowly removed by heating and/or vacuum. Hybrid nanoparticles are formed in the mixture as the solvent is removed. The resultant hybrid nanoparticles consist of a PCM core and a polymer shell embedded with the nanoparticles.

In another embodiment of the invention for making the hybrid nanoparticle containing a PCM core and a polymer shell embedded with nanoparticles, the PCM particles are prepared first using the methods discussed in Example 1. The particles are mixed with a polymer dissolved in water and nanoparticles containing surface charges. The resultant mixture is then cooled below the theta point of the polymer to precipitate it on the surface of the PCM particles. In the process, the nanoparticles stay embedded in the polymer shell. The resultant hybrid nanoparticle has a PCM core and a polymer shell embedded with the nanoparticles.

Example 6, below illustrate the process of making the nanoparticles comprising PCM-polymer shell embedded with nanoparticles.

EXAMPLE 6

Step 1: Paraffin, polymethyl methacrylate (PMMA), gold colloids with thiol groups and a mixture of solvents (i.e., alcohols, ketones, tetrahydrofuran, hexane, etc.) are mixed in a container to create a liquid (paraffin is dissolved in this liquid at room temperature).

Step 2: The resulting liquid from Step 1 is added to water with an emulsifier, sodium stearic acid. Very high shear is used to create an emulsion.

Step 3: The solvent is slowly removed by vacuum and/or heating.

Step 4: The result is a dispersion of paraffin (hydrophobic PCM) particles with a PMMA hydrophilic layer containing gold nanoparticles in an aqueous phase.

The resultant hybrid nanoparticles can be dispersed in a heat transfer medium, for example, water, ethylene glycol (EG), propylene glycol (PG), glycol/water mixtures, hydrocarbon oils, vegetable oils, silicone oils, alcohols, brines, fluorocarbons and the resultant fluid containing the nanoparticles can be circulated in a system to remove heat from a heat source and carry it to a heat sink. The concentration of nanoparticles in the resultant heat transfer fluid can be from 0.01% by weight to about 50% by weight of the total liquid phase. In addition to the nanoparticles, additives can be added to the heat transfer fluids. These additives comprise antioxidants, corrosion inhibitors, anti-foam agents, lubricating agents, chelating agents, surfactants, dyes, viscosity modifiers and buffers.

These hybrid nanoparticles can also be used in other process applications, for example, in a heat transfer gel, thermal interface materials, sensors and biomedical applications.

Example 7, below illustrate the process of making the nanoparticles comprising PCM-polymer shell embedded with nanoparticles.

EXAMPLE 7

Step 1: Paraffin (PCM) is melted at 65° C. The melting point of the paraffin is 50° C. in this example.

Step 2: Melted paraffin is added to water containing an emulsifier, for example, sodium stearic acid at 65° C. using high shear mixing to create an emulsion of the paraffin in water. Alternatively, paraffin can be added to water containing sodium stearic acid. Then the mixture is heated to 65° C. and mixed by applying high shear to create an emulsion of the paraffin in water.

Step 3: The resulting emulsion is cooled below the melting point of paraffin (50° C.) to solidify the paraffin. The result is a dispersion of the PCM core particles in water medium.

Step 4: Polyvinyl pyrrolidone and gold colloids containing thiol groups are added to the aqueous phase and dissolved by stirring.

Step 5: The resultant mixture is cooled to about 25° C. (below the Theta point of polyvinyl pyrrolidone).

Step 6: The nanoparticle that results is a paraffin core with a polyvinyl pyrrilidone layer containing gold colloids embedded in it.

The resultant hybrid nanoparticles can be dispersed in a heat transfer medium such as water, ethylene glycol (EG), propylene glycol (PG), glycol/water mixtures, hydrocarbon oils, vegetable oils, silicone oils, alcohols, brines, fluorocarbons and the resultant fluid containing the nanoparticles can be circulated in a system to remove heat from a heat source and carry it to a heat sink. The concentration of nanoparticles in the resultant heat transfer fluid can be from about 0.01% by weight to about 50% by weight of the total liquid phase. In addition to the nanoparticles, additives can be added to the heat transfer fluids. These additives comprise antioxidants, corrosion inhibitors, anti-foam agents, lubricating agents, chelating agents, surfactants, dyes, viscosity modifiers and buffers.

These hybrid nanoparticles can also be used in other process applications, for example, in heat transfer gels, thermal interface materials, sensors and biomedical applications.

The foregoing examples have been provided merely for the purpose of explanation and are in no way to be construed as limiting of the method and system disclosed herein. While the invention has been described with reference to various embodiments, it is understood that the words, which that have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in all its aspects.

We claim:

1. A hybrid nanoparticle comprising:
   a phase change material constituting an inner core of said hybrid nanoparticle, wherein the phase change material comprises one of hydrocarbons, wax, paraffins, salt hydrates, silicones, and polymers; and
   an impermeable metal shell, the impermeable metal shell encapsulating the phase change material and containing said phase change material in different phases of said phase change material.

2. The nanoparticle of claim 1 wherein the average diameter of the nanoparticle is from about 10 nanometers to about 1000 nanometers.

3. The nanoparticle of claim 1 wherein the metal shell comprises a metal or a metal alloy with a thermal conductivity of 100 watts/m. K. or higher.

4. The nanoparticle of claim 3 wherein the metal comprises one of copper, gold, silver, aluminum, iron, and nickel.

5. The hybrid nanoparticle of claim 1, wherein a melting point of said phase change material differs substantially from a melting point of the impermeable metal shell.

6. A hybrid nanoparticle comprising:
   a phase change material constituting an inner core of said hybrid nanoparticle, wherein the phase change material comprises one of hydrocarbons, wax, paraffins, salt hydrates, silicones, and polymers;
   a polymer layer, the polymer layer encapsulating the phase change material, and
   an impermeable metal shell encapsulating the polymer layer, said polymer layer and said impermeable metal shell containing said phase change material in different phase change states.

7. The nanoparticle of claim 6 wherein the average diameter of the nanoparticle is from about 10 nanometers to about 1000 nanometers.

8. The nanoparticle of claim 6 wherein the polymer comprises polyvinyl pyrrolidone.

9. The nanoparticle of claim 6 wherein the metal shell comprises a metal or a metal alloy with a thermal conductivity of 100 W/m.K or higher.

10. The nanoparticle of claim 9 wherein the metal comprises one of copper, gold, silver, aluminum, iron and nickel.

11. A heat transfer fluid containing suspended nanoparticles, said nanoparticles comprising:
a phase change material, a polymer layer, the polymer layer encapsulating the phase change material, and a metal shell, the metal shell encapsulating the polymer layer.

12. A hybrid nanoparticle comprising:
a phase change material constituting an inner core of said hybrid nanoparticle, and
a polymer shell embedded with nanoparticles, said polymer shell encapsulating the phase change material, wherein the average diameter of the hybrid nanoparticle is from about 10 nanometers to about 1000 nanometers, and wherein the average diameter of the embedded nanoparticles is from about 1 nanometer to about 20 nanometers.

13. The nanoparticle of claim 12 wherein the phase change material comprises one of hydrocarbons, wax, paraffins, salt hydrates, polymers and silicones.

14. The nanoparticle of claim 12 wherein the polymer shell comprises one of polymethyl methacrylate, polystyrene, and polyvinyl pyrrolidone.

15. The nanoparticle of claim 12 wherein the embedded nanoparticles in the polymer layer comprise materials with a thermal conductivity greater than 100 W/m.K.

16. The nanoparticle of claim 15 wherein the nanoparticles embedded in the polymer layer comprises one of copper, diamond, carbon nanotube, silver, gold, aluminum, nickel, silicon and iron.

17. A heat transfer fluid containing suspended hybrid nanoparticles, said hybrid nanoparticles comprising:
a phase change material,
a polymer shell embedded with nanoparticles, said polymer shell encapsulating the phase change material, wherein the average diameter of the hybrid nanoparticle is from about 10 nanometers to about 100 nanometers, and wherein the average diameter of the embedded nanoparticles is from about 1 nanometer to about 20 nanometers.

18. A hybrid nanoparticle comprising:
a phase change material constituting an inner core of said hybrid nanoparticle,
a polymer layer, the polymer layer encapsulating the phase change material, wherein the phase change material comprises one of hydrocarbons, wax, paraffins, salt hydrates, polymers and silicones, and wherein the polymer comprises one of polyvinyl pyrrolidone, polymethyl methacrylate, polyvinyl imidazole, and a polymerized mixture of styrene and vinyl imidazole comonomers; and
a metal shell, the metal shell encapsulating the polymer layer.

* * * * *